United States Patent
Takai et al.

(10) Patent No.: US 6,733,882 B2
(45) Date of Patent: May 11, 2004

(54) RARE EARTH HYDROXIDE AND METHOD FOR THE PREPARATION THEREOF

(75) Inventors: Yasushi Takai, Fukui-ken (JP); Toshihiko Tsukatani, Fukui-ken (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 353 days.

(21) Appl. No.: 09/923,441

(22) Filed: Aug. 8, 2001

(65) Prior Publication Data

US 2002/0022569 A1 Feb. 21, 2002

(30) Foreign Application Priority Data

Aug. 10, 2000 (JP) ........................................ 2000-243354

(51) Int. Cl.[7] ................................................. B32B 5/16
(52) U.S. Cl. ...................................... 428/402; 423/263
(58) Field of Search ........................... 428/402; 423/263

(56) References Cited

U.S. PATENT DOCUMENTS

| | | | |
|---|---|---|---|
| 4,758,412 A | * | 7/1988 | Fabre et al. ................ 423/21.1 |
| 5,030,424 A | * | 7/1991 | Fulford et al. ............. 423/21.5 |
| 5,496,528 A | * | 3/1996 | David et al. ................ 423/263 |
| 5,545,386 A | * | 8/1996 | Kaneyoshi et al. ......... 423/263 |

* cited by examiner

*Primary Examiner*—H. Thi Le
(74) *Attorney, Agent, or Firm*—Wenderoth, Lind & Ponack, LLP

(57) ABSTRACT

The invention discloses a method for the preparation of a rare earth hydroxide powder in which, different from the conventional wet-process hydroxide precipitation method in an aqueous solution of a rare earth salt by the addition of an alkali, a powder of a rare earth oxide is brought into contact with a limited amount of water in the form of either liquid or vapor and kept in contact with water at a temperature of 30 to 200° C. The thus prepared rare earth hydroxide powder is characterized by a small crystallite diameter not exceeding 40 nm and outstandingly low contents of impurity chlorine and nitrate ions originating in the starting rare earth salt in the hydroxide prepared by the conventional wet-process method. The inventive rare earth hydroxide powder is advantageous as a component ingredient or as an adjuvant in the ceramic compositions for the preparation of a sintered dielectric ceramic bodies in respects of the greater dielectric constant and smaller temperature dependency of the dielectric constant than similar ceramic bodies prepared from a conventional rare earth hydroxide or oxide.

7 Claims, No Drawings

RARE EARTH HYDROXIDE AND METHOD FOR THE PREPARATION THEREOF

BACKGROUND OF THE INVENTION

The present invention relates to a rare earth hydroxide and a method for the preparation thereof. More particularly, the invention relates to a rare earth hydroxide powder characterized by unique properties and having usefulness as a base ingredient or as an adjuvant in various ceramic dielectric materials and other sintered ceramic materials as well as to a novel method for the preparation of such a rare earth hydroxide powder from a corresponding rare earth oxide.

It is a well known and established technology to employ a rare earth compound as an adjuvant in the preparation of a variety of ceramic materials including those in electronic or dielectric devices such as dielectric filters and ceramic capacitors and ceramic structural bodies of silicon nitride, aluminum nitride and the like. When a compound of lanthanum or neodymium is used as an adjuvant in ceramic compositions, it is usual that the rare earth compound is an oxide of the respective rare earth element. A problem encountered in the use of lanthanum oxide or neodymium oxide is the strong hygroscopicity of these rare earth oxides. Namely, these rare earth oxides readily absorb moisture from the ambient atmosphere and are rapidly converted at least partly into the hydroxide of the respective rare earth element resulting in an uncontrollable changes in the compounding amount of the rare earth oxide with other base ingredients of the ceramic compositions under preparation from time to time.

As a means for solving the problem due to moisture absorption of a rare earth oxide to cause a weight change with time, a method sometimes undertaken is the use of a rare earth hydroxide in place of the corresponding rare earth oxide. Rare earth hydroxides are usually prepared by a wet-process method. Namely, an aqueous solution of a rare earth salt such as a nitrate and chloride is admixed with an aqueous alkaline solution such as ammonia water and an aqueous solution of sodium hydroxide at a temperature from room temperature up to about 80° C. to effect precipitation of the rare earth hydroxide precipitates having good filtrability which are collected by filtration, washed thoroughly with water and finally dried at a temperature not exceeding 200° C. (see Japanese Patent Kokai 62-65928 and 09-188515). The crystallites as the primary particles forming the rare earth hydroxide particles obtained in this wet-process method, however, have irregular configurations so that the particle diameter thereof cannot be determined by the X-ray diffractometric method.

In addition, the secondary particles have a needle-formed configuration and exhibit strong agglomeration to form agglomerates of a relatively large particle diameter. The above named Japanese patent documents disclose that the secondary particles have a particle diameter of 2 to 100 $\mu$m or 5 to 100 $\mu$m, respectively. As a consequence of such a relatively large particle size, the hydroxide precipitates have good filtrability from the aqueous precipitation medium. The thus obtained rare earth hydroxide particles, however, are too coarse for some applications necessitating further comminution by using a grinding mill, jet mill and the like. The rare earth hydroxide powder after further comminution in this way is still not quite satisfactory as an adjuvant to a base ingredient of a ceramic composition because of the poor dispersibility due to strong agglomeration.

Another problem encountered in the wet-process preparation of rare earth hydroxide particles is the poor washability of the precipitates as a consequence of the irregular configuration of the primary particles. Namely, it is an extremely difficult matter to completely wash away the residual ions such as nitrate ions, chloride ions, sodium ions ammonium ions and others strongly adsorbed from the precipitation medium onto the irregular primary particles. If a rare earth hydroxide powder containing a substantial amount of these adsorbed ions is used as an adjuvant in ceramic materials, noxious gases such as Nox and chlorine are eventually generated from the ceramic body under sintering to cause damages on the furnace linings and environmental pollution.

Japanese Patent Kokai 11-349376 recommends samarium oxide having hydroxyl groups on the particle surface as a base material for the preparation of a filter device in a microwave resonator. This is because, although the problem of hygroscopicity is solved at least partly in commercially available rare earth hydroxides prepared by wet-process ball-milling in an aqueous medium, the above mentioned problems cannot still be solved therewith and, when rare earth oxide particles are ball-milled in an aqueous medium, oxide particles having hydroxyl groups on the particle surface only can be obtained, which, however, are still not quite satisfactory in respect of physical properties.

SUMMARY OF THE INVENTION

In view of the above described problems and disadvantages in the prior art, the present invention has a primary object to provide a novel rare earth compound which is free from uncontrollable changes with time in the rare earth content due to moisture absorption unnecessitating precise determination of the rare earth content in each time of compounding with the base ingredients of the ceramic material, which exhibits good dispersibility to the base ingredient of the ceramic materials and which can be used as an adjuvant even in a ceramic material, in which moisture should be avoided, because of the very low content of water of crystallization or adherent water.

The rare earth compound provided by the present invention to accomplish the above described primary object of the invention is a rare earth hydroxide characterized by the parameters;

that the crystallites have a particle diameter not exceeding 40 nm as measured by the X-ray diffractometric method;

that the content of impurities does not exceed 300 ppm for chlorine and 100 ppm for nitrate ions;

that the weight loss by ignition for 1 hour at 1000° C. is not larger or not smaller by more than 2% by weight than the theoretical value for the conversion of the rare earth hydroxide to the rare earth oxide; and that the secondary particles as an agglomerate of the crystallites have an average particle diameter in the range from 0.1 $\mu$m to 2 $\mu$m.

When the rare earth hydroxide is neodymium hydroxide, in particular, it is preferable that, in addition to the above given characterizing parameters, the hydroxide has a color difference value L*a*b* of which L* does not exceed 95, a* is in the range from 3 to 6 and b* is in the range from −10 to −5.

The present invention also provides a method for the preparation of the above defined specific rare earth hydroxide, which comprises the steps of:

(a) bringing a powder of a rare earth oxide into contact with water either in the liquid form or in the vapor form in an amount of from 1.5 moles to 3.0 moles per mole of the rare earth oxide; and (b) keeping the rare earth oxide powder in contact with water at a temperature in the range from 30° C. to 200° C.

DETAILED DESCRIPTION OF THE PREFERRED EMBODIMENTS

The rare earth hydroxide as the subject matter of the present invention is a compound represented by the general formula $R(OH)_3$, in which R is a rare earth element selected from the group consisting of yttrium and the elements having an atomic number in the range from 57 to 71. The present invention is of course applicable when the rare earth hydroxide is derived from a combination of two kinds or more of these rare earth elements.

When the rare earth hydroxide of the present invention is used as an adjuvant in various electronic ceramic materials as in dielectric filters and ceramic capacitors, of which the base ingredient of the ceramic material is assumed to be barium titanate, for example, the rare earth adjuvant is admixed with the base ingredient in the form of a rare earth titanate which is a reaction product prepared in advance from titanium dioxide and the rare earth hydroxide.

Commercially available products of barium titanate and titanium dioxide usually have a particle diameter in the range from 0.1 μm to 0.5 μm. Since it is desirable, in the admixture of a rare earth hydroxide to the base ingredient of the ceramic material that the rare earth hydroxide particles are distributed in such a fashion as to cover the surface of the particles of the base ingredient, that the primary particles of the rare earth hydroxide have a particle diameter not exceeding 40 nm which is about one tenth of the particle diameter of the base ingredient.

The particle diameter of the rare earth hydroxide crystallites as the primary particles can be determined by the X-ray diffractometric Scherrer method. Although the desired value can be obtained by various other methods including the direct size measurement on an electron microscopic photograph of the crystallites taken with a transmission electron microscope, this method is not suitable for the industrial purpose of quality control of the products because this method is time-consuming.

When the crystallites of the rare earth hydroxide have a particle diameter greater than 40 nm, the hydroxide particles can hardly be dispersed in such a desirable fashion as to cover the surface of the particles of the ceramic base ingredient. A rare earth hydroxide powder of which the crystallites have a particle diameter not exceeding 40 nm has a specific surface area of 4 to 25 m²/g oe, preferably, 6 to 20 m²/g as determined by the BET method.

Since conventional rare earth hydroxides are prepared by the wet-process method starting from a nitrate or chloride of the rare earth element, it is almost always that the rare earth hydroxide products in the prior art contain nitrate ions or chlorine in a substantial impurity level. In contrast thereto, the content of these impurities in the inventive rare earth hydroxide is outstandingly low not to exceed 300 ppm for chlorine and not to exceed 100 ppm for nitrate ions.

It is assumable that an ignition treatment for 1 hour at 1000° C. is sufficient for complete conversion of 2 moles of a rare earth hydroxide of the formula $R(OH)_3$, which is free from any water of crystallization or adherent water, into one mole of the corresponding rare earth oxide $R_2O_3$ according to the reaction equation $$2R(OH)_3 = R_2O_3 + 3H_2O.$$

The theoretical weight loss by ignition or, simply, ignition loss implied in this invention is a value obtained by dividing the weight difference between 2 moles of the rare earth hydroxide $R(OH)_3$ and 1 mole of the rare earth oxide $R_2O_3$ by the weight of 2 moles of the rare earth hydroxide multiplied by 100 for percentage expression. Taking the atomic weights of yttrium, oxygen and hydrogen as 89, 16 and 1, respectively, for example, the theoretical ignition loss of yttrium hydroxide is calculated as 19.3%. Similarly, the theoretical ignition loss values for lanthanum hydroxide, neodymium hydroxide and lutetium hydroxide can be calculated as 14.2%, 13.8% and 11.9%, respectively.

Taking into account the unavoidable error in the actual determination of the ignition loss of a rare earth hydroxide, which is estimated to be about ±1% by weight when the rare earth hydroxide is subjected to ignition at 1000° C. for 1 hour, it is one of the requirements for the inventive rare earth hydroxide that the ignition loss value as determined within ±2% by weight of the theoretical ignition loss value. A too low value of the ignition loss as determined below this range is suggestive of a residual content of unhydroxylated rare earth oxide which loses no weight by ignition so that the powder may be subject to a weight increase with time by moisture absorption. A too high value of the ignition loss as determined, on the other hand, is suggestive of the presence of water of crystallization of certain types or adherent water or intermixing of chlorine, nitrate or other dissipatable impurities. The above mentioned theoretical value of ignition loss is a value obtained from the equation $$\text{Theoretical ignition loss}, \% = [1 - RO_x/R(OH)_3] \times 100,$$

in which R is a rare earth element and the subscript x is 1.5 for all of the rare earth elements except that x=2 for cerium, x=7/4 for terbium and 11/6 for praseodymium.

Theoretically, admixture and dispersion of the adjuvant hydroxide particles into the particles of the base ceramic ingredient could be accomplished most easily when the particle diameter of the crystallites and the particle diameter of the secondary particles coincide each with the other to form a monodisperse phase. Practically, however, it can rarely be the case that the hydroxide particles as a monodisperse phase remain fully stable especially when the crystallite diameter is extremely small to be as small as 40 nm or finer. Moreover, a powder of a small particle size usually has a very small bulk density to cause inconveniences in handling. Accordingly, it is preferable that the secondary particles are formed each of an agglomerate of several to several tens of primary particles. In particular, the secondary particles preferably have an average particle diameter $D_{50}$ in the range from 0.1 μm to 2 μm.

The above mentioned average particle diameter $D_{50}$ of the secondary particles of the rare earth hydroxide particles can be determined in the particle size distribution measurement by the laser beam diffraction method with the powder after an ultrasonic dispersion treatment for 3 minutes at a 40 watts output. When the average particle diameter of the secondary particles is too small, the powder has a small bulk density or large bulk volume to cause inconveniences in handling. When the average particle diameter of the secondary particles is too large, on the other hand, uniform dispersion of the particles in the particles of the base ceramic ingredient can hardly be accomplished. In this regard, it is preferable that the average particle diameter $D_{50}$ of the secondary particles is in the range from 0.1 μm to 2.0 μm with a bulk density of the powder in the range from 0.15 to 0.5 g/cm³. The above mentioned $D_{50}$ value is defined in such a way that $D_n$ in general gives the particle diameter when n % of the particles have a diameter smaller than $D_n$.

Assuming that the intended application of the inventive rare earth hydroxide is as an adjuvant in ceramic materials, fineness of the crystallites and secondary particles is not the only requirement for the powder but it is desirable that the particle size distribution of the particles be as narrow as possible. It is particularly desirable in this regard that the dispersion index $(D_{90}-D_{10})/(D_{90}+D_{10})$ as determined in the particle size measurement by the laser beam diffraction method does not exceed 0.6 for the powder after an ultrasonic dispersion treatment for 3 minutes at 40 watts output.

Besides, the color tone of a rare earth hydroxide product may give some clue on the quality of the rare earth hydroxide product. Taking neodymium compounds as an example, for example, neodymium hydroxide exhibits unique bluish violet color, neodymium oxide exhibits pale sky blue and neodymium chloride and neodymium nitrate each exhibit purple so that it is natural that the color of a neodymium hydroxide product is affected when containing a substantial amount of unreacted neodymium oxide or neodymium chloride or nitrate to give a change in the color difference value Lab. Similarly, the color difference value is affected also by intermixing of a coloring transition metal element such as the iron group elements. According to the results of the color difference measurement to determine the $L^*a^*b^*$ value undertaken with neodymium hydroxide products prepared by the inventive method, which were particularly free from neodymium oxide or neodymium chloride and nitrate and contained less than 50 ppm by weight of the iron group transition elements, $L^*$ was 90 to 95, $a^*$ was 3 to 6 and $b^*$ was −10 to −5.

Basically different from conventional wet-process methods, the inventive method for the preparation of a rare earth hydroxide is unique but very simple. In the inventive method, namely, a rare earth oxide as the starting material is gradually reacted with water necessary for conversion of the oxide into a hydroxide. The rare earth oxide as a starting material is gradually brought into contact with 1.5 to 3.0 times by moles of water in the form of either a liquid or a vapor at a temperature in the range from 30 to 200° C. The rare earth oxide should have an average crystallite diameter of 10 to 80 nm and an average particle diameter of 0.1 to 10 μm.

It is important that the starting rare earth oxide is gradually brought into contact with water because the reaction between a rare earth oxide and water is an exothermic reaction. The temperature of the reaction conducted for 1 to 24 hours, which is generally from 30 to 200° C., is selected depending on the rare earth elements. For example, lanthanum oxide has a relatively high reactivity with water so that the reaction can proceed even at 30° C. although it is preferable that the temperature is increased to accelerate the reaction. The reaction of the oxide of a rare earth element other than lanthanum usually requires a reaction temperature of 70° C. or higher and the oxide of a so-called heavy rare earth element requires a reaction temperature of 100° C. or higher. A reaction temperature exceeding 200° C. is undesirable because of the possible oxidation reaction of the once formed hydroxide with atmospheric oxygen to form an oxyhydroxide of the rare earth element resulting in a decrease in the quality of the rare earth hydroxide product although the impurity contents of chlorine and nitrates can be decreased by the reaction at high temperatures.

The rare earth hydroxide products of the present invention are useful as an ingredient in the precision formulation of a ceramic composition for the preparation of various kinds of electronic ceramic devices such as ceramic dielectric filters and ceramic capacitors and as an adjuvant in ceramic structural members based on silicon nitride, aluminum nitride and the like. For example, the dielectric filters employed in mobile telephones are prepared from a barium rare earth titanate-based ceramic composition, of which the rare earth element is preferably selected from lanthanum, cerium, praseodymium, neodymium and samarium.

In the preparation of a ceramic dielectric filter, the starting materials, i.e. barium carbonate, titanium dioxide and a rare earth compound, are taken in an exactly controlled proportion and intimately blended together in a wet process by using a ball mill followed by dehydration, drying and calcination in atmospheric air. The thus calcined material is again blended by a wet process with an organic binder and the slurry thus obtained is subjected to spray drying into dried granules from which a ceramic body for the dielectric filter is prepared by molding and sintering. While the rare earth compound used as one of the starting materials in the above described process is conventionally a rare earth oxide, advantages are obtained by replacing the rare earth oxide with the inventive rare earth hydroxide including a decrease in the blending time of the starting materials, decrease of the sintering temperature and improvements of the characteristics of the dielectric filter as a consequence of the increased accuracy in the compounding proportion of the starting materials.

In the following, several embodiments of the present invention are described in more detail by way of an Example and a Comparative Example, which, however, never limit the scope of the invention in any way.

EXAMPLE 1

An aqueous slurry was prepared in a pressurizable vessel of 1 liter capacity by thoroughly blending 164 g of a neodymium oxide powder having an average particle diameter of 5 μm and an average crystallite diameter of 40 nm with 27 g of deionized water. The aqueous slurry was kept as such for 4 hours at a temperature in the range from 70 to 120° C. so that the neodymium oxide was converted into neodymium hydroxide.

The thus obtained neodymium hydroxide powder was subjected, after an ultrasonic dispersion treatment for 3 minutes at 40 watts, to the particle size distribution measurement of the secondary particles by the laser beam diffraction method to give a result of $D_{10}=0.56$ μm, $D_{50}=0.88$ μm and $D_{90}=1.43$ μm corresponding to a dispersion index of 0.43. The crystallite diameter was 30 nm as determined by the X-ray diffractometric Scherrer method. The neodymium hydroxide had a specific surface area of 10.9 m²/g as determined by the BET method specified in JIS R 1626.

The neodymium hydroxide powder exhibited a weight loss of 13.8% by ignition at 1000° C. for 1 hour and the bulk density thereof was 0.31 g/cm³. The color difference value determined by using a colorimeter according to the procedure specified in JIS Z 8729 gave $L^*=91.7$, $a^*=4.74$ and $b^*=-6.9$. The content of iron therein was 12 ppm by weight as determined by the ICP method.

The contents of chlorine and nitrate ions in the neodymium hydroxide product were 100 ppm and 50 ppm, respectively, as determined by the turbidimetric method and by the combustion-IR method, respectively.

A 300 g portion of a ternary powder blend of barium carbonate, the neodymium hydroxide obtained above and titanium dioxide in a molar proportion of $BaO:Nd_2O_3:Ti_2O_3=1:1:5$ was admixed with 300 g of water and blended in a ball mill for 12 hours followed by drying at 100° C. for 24 hours and the dried powder blend was calcined in air at 800° C. for 2 hours. The thus calcined powder blend was admixed with 450 g of water and 0.6 g of carboxymethyl cellulose as a binder and again blended in a ball mill for 12 hours followed by spray drying into granules which were compression-molded in a metal mold having a cavity of 20 mm diameter under a compression pressure of 49.0 MPa into a powder compact of a pellet form. The powder compact was subjected to a sintering treatment in air at 1350° C. for 4 hours and the sintered body was mechanically worked into a pellet having a diameter of 15 mm and a height of 5 mm.

The dielectric constant $\in$ of this sintered ceramic body at a frequency of 2 GHz was determined by using an LCZ meter at 20° C. and 80° C. The dielectric constant at 20° C. was 80 and the temperature dependency of the dielectric constant calculated from the values at 20 and 80° C. was −10 ppm/° C.

COMPARATIVE EXAMPLE 1

Into a 0.5 liter volume of an aqueous solution of neodymium chloride in a concentration of 0.1 mole/liter taken in a glass beaker of 2 liter capacity, 0.6 liter of a 0.3 mole/liter ammonia water was added dropwise over a period of about 1 hour under agitation with a stirrer rotating at 300 rpm. The precipitates formed in the aqueous medium were collected by filtration and thoroughly washed with water and the thus obtained wet cake was dried at 110° C. for 24 hours to give a neodymium hydroxide powder, which was subjected to the determination of the color difference value to give the result of $L^*$=87, $a^*$=6.6 and $b^*$=−10.4.

The particle size distribution of the secondary particles of this neodymium hydroxide powder was determined by the laser beam diffraction method to give a result of $D_{10}$=2.6 μm, $D_{50}$=15.3 μm and $D_{90}$=85.3 μm corresponding to a dispersion index of 0.94. An attempt to determine the crystallite diameter by the X-ray diffractometric Scherrer method failed to give a value due to the irregular configuration of the particles. The neodymium hydroxide powder had a BET specific surface area of 26 $m^2$/g and a bulk density of 0.6 g/$cm^3$. The powder exhibits a weight loss of 16.6% by ignition at 1000° C. for 1 hour. The contents of impurity chlorine and nitrate ions determined in the same manner as in Example 1 were 1000 ppm and 100 ppm, respectively.

The neodymium hydroxide powder was processed into a sintered ceramic body with barium carbonate and titanium dioxide in the same manner as in Example 1. The ceramic body in the form of a pellet had a dielectric constant at a frequency of 2 GHz of 78 at 20° C. with a temperature dependency of −20 ppm/° C.

As is understood by making comparison between Example 1 and Comparative Example 1 described above, the neodymium hydroxide samples prepared in these two examples differ each from the other in various characterizing parameters. The differences in the properties influence the performance of the sintered ceramic bodies as a dielectric member, in particular, relative to the dielectric constant and the temperature dependency thereof. Since the factor of temperature dependency of the dielectric constant is so small as to be −10 ppm/° C., mobile telephones and other household electric appliances usually working within a temperature range of 20 to 80° C. can be imparted with stability of the dielectric constant by using ceramic capacitors, resonators and the like prepared by using the rare earth hydroxidetant according to the present invention.

EXAMPLE 2

A 174 g portion of samarium oxide having an average particle diameter of 3.5 μm and an average crystallite diameter of 28 nm and 32 g of deionized water were taken and thoroughly mixed together in a pressurizable vessel and kept at 20 to 80° C. for 4 hours to give samarium hydroxide particles of which the particle size distribution of the secondary particles was measured by the laser beam diffraction method to find values of $D_{10}$=1.12 μm, $D_{50}$=1.82 μm and $D_{90}$=3.03 μm corresponding to a dispersion index of 0.43. The average particle diameter of the primary particles was 40 nm as determined by the X-ray diffractometric Scherrer method. The ignition loss of the powder by ignition at 1000° C. for 1 hour was 13.1% and the bulk density of the powder was 0.19 g/$cm^3$. The content of chlorine was 60 ppm by the turbidimetric method and the content of nitrate ions was less than 50 ppm as determined by the combustion-IR method for the nitrogen content.

A 300 g portion of a powder blend of the thus obtained samarium hydroxide, barium carbonate and titanium dioxide in a proportion corresponding to $Ba_{0.98}Sm_{0.02}TiO_3$ was mixed with 300 g of water in a ball mill for 24 hours followed by the addition of 1.5 g of polyvinyl alcohol and further continued ball-milling for additional 6 hours. After drying at 100° C. for 24 hours, the dried powder blend was compression-molded in a metal mold having a cavity of 20 mm diameter under a pressure of 500 kg/$cm^2$ and the thus obtained powder compact was subjected to calcination in air at 1200° C. for 4 hours. The thus obtained sintered body was worked into a pellet of 15 mm diameter and 5 mm height, which had a breakdown voltage of 200 volts.

COMPARATIVE EXAMPLE 2

Into 1 liter of a 2 moles/liter aqueous solution of samarium nitrate at 20° C. under agitation with a stirrer rotating at 200 rpm, 2 liters of a 0.2 mole/liter aqueous solution of oxalic acid were added over a period of 20 minutes followed by standing for 20 minutes to effect aging of the precipitates which were collected by filtration followed by washing with water and calcination in air at 800° C.

The thus obtained samarium oxide particles had a particle size distribution of $D_{10}$=1.12 μm, $D_{50}$=3.26 μm and $D_{90}$=5.17 μm corresponding to a dispersion index of 0.64 while the average particle diameter of the primary particles was 25 nm as determined by the same methods as in the preceding example. The powder had a BET specific surface area of 5.8 $m^2$/g and exhibited an ignition loss of 1.3% by ignition at 1000° C. for 1 hour. The content of chlorine and nitrate ions were each 50 ppm.

A sintered ceramic pellet of the composition of the formula $Ba_{0.98}Sm_{0.02}TiO_3$ prepared in the same manner as in the preceding example by using this samarium oxide powder had a breakdown voltage of 170 volts.

When barium titanate ceramic is prepared with admixture of a small amount of a rare earth element, the ceramic exhibits a positive resistance-temperature relationship or the so-called PCT characteristic at a temperature in the vicinity of the Curie temperature. As is known, various PCT devices utilizing this PCT characteristic are currently under applications. As is understood by making comparison between Example 2 and Comparative Example 2 making replacement of the conventional rare earth oxide with the rare earth hydroxide of the invention, a substantial improvement can be obtained in the breakdown voltage of the ceramic body so that the rare earth hydroxide according to the present inven-

EXAMPLE 3

A pressurizable vessel was charged with 300 g of lanthanum oxide having an average particle diameter of 2.3 µm and an average crystallite diameter of 25 nm and 55 g of deionized water and the blend after thorough agitation was kept for 4 hours at a temperature of 80 to 100° C. to give lanthanum hydroxide. The thus obtained lanthanum hydroxide powder had a particle size distribution of $D_{10}=1.1$ µm, $D_{50}$ of 2.0 µm and $D_{90}=3.3$ µm corresponding to a dispersion index of 0.5 while the average particle diameter of the primary particles was 36 nm. The BET specific surface area of the powder was 8.1 m$^2$/g and the ignition loss at 1000° C. after 1 hour was 14.3%. The contents of chlorine and nitrate ions therein were 120 ppm and 70 ppm, respectively.

What is claimed is:

1. A rare earth hydroxide in the form of a powder of which the crystallite diameter does not exceed 40 nm by the X-ray diffractometric method and the contents of chlorine and nitrate ions as impurities do not exceed 300 ppm by weight and 100 ppm by weight, respectively.

2. The rare earth hydroxide as claimed in claim 1 of which the weight loss by ignition at 1000° C. for 1 hour is not larger or not smaller by more than 2% by weight than the theoretical value for the conversion of the hydroxide into the oxide.

3. The rare earth hydroxide as claimed in claim 1 of which the secondary particles of the powder have an average particle diameter in the range from 0.1 to 2 µm.

4. Neodymium hydroxide in the form of a powder of which the crystallite diameter does not exceed 40 nm by the X-ray diffractometric method and the contents of chlorine and nitrate ions as impurities do not exceed 300 ppm by weight and 100 ppm by weight, respectively.

5. The neodymium hydroxide as claimed in claim 4 of which the weight loss by ignition at 1000° C. for 1 hour is not larger or not smaller by more than 2% by weight than the theoretical value for the conversion of neodymium hydroxide into neodymium oxide.

6. The neodymium hydroxide as claimed in claim 4 of which the secondary particles of the powder have an average particle diameter in the range from 0.1 to 2 µm.

7. The neodymium hydroxide as claimed in claim 4 of which the color difference value L*a*b* gives L* of 90 to 95. a* of 3 to 6 and b* of −10 to −5.

* * * * *